United States Patent [19]

Beck et al.

[11] 4,261,816
[45] Apr. 14, 1981

[54] METHOD OF AND DEVICE FOR PRODUCING ENSILAGE FROM CORN-EARLAGE

[75] Inventors: Adolf Beck; Gerhard Rödel, both of Freising; Rupert Riemensberger, Giggenhausen; Klaus Grimm, Freising, all of Fed. Rep. of Germany

[73] Assignee: Karl Mengele & Söhne, Gunzburg, Fed. Rep. of Germany

[21] Appl. No.: 62,631

[22] Filed: Aug. 1, 1979

Related U.S. Application Data

[63] Continuation-in-part of Ser. No. 5,466, Jan. 22, 1979, abandoned, which is a continuation of Ser. No. 830,706, Sep. 6, 1977, abandoned.

[30] Foreign Application Priority Data

Sep. 8, 1976 [DE] Fed. Rep. of Germany ....... 2640290

[51] Int. Cl.³ .............................................. C10G 19/00
[52] U.S. Cl. ..................................... 209/284; 209/296; 209/407; 426/623; 426/630; 426/481; 426/482; 426/807
[58] Field of Search .................. 426/635, 636, 53, 54, 426/2, 623, 630, 807, 481, 482; 209/284, 300, 407, 296

[56] References Cited

U.S. PATENT DOCUMENTS

| 653,777 | 7/1900 | Melin | 209/407 |
|---|---|---|---|
| 1,105,415 | 7/1914 | French | 426/623 |
| 1,395,746 | 11/1921 | Sharp | 426/623 |
| 2,349,818 | 5/1944 | Fetzer | 426/623 |
| 2,633,852 | 4/1953 | Lupton | 209/407 X |
| 2,946,523 | 7/1960 | Phillips | 426/407 X |

OTHER PUBLICATIONS

Morrison "Feeds & Feeding", Morrison Publishing Co. Ithaca New York, 1956, pp. 13, 15–16, 51–52, 338–342 & 413–421.

*Primary Examiner*—R. B. Penland
*Attorney, Agent, or Firm*—Toren, McGeady and Stanger

[57] ABSTRACT

Corn-earlage is processed so that the kernels and corn-cobs are finely chopped while the husks retain their raw fiber structure. The mixture of the finely chopped kernels and corn-cobs along with husks is placed in a silo to produce ensilage. If the ensilage is to be used to feed hogs, it is removed from the silo and passed through a screen or separating drum for adjusting the fiber content of the material. Depending on the fiber content desired, the material is introduced into the screen drum provided with a number of serially arranged rows of screen plates. Each row has a removable plate which can be replaced with other plates having larger or smaller openings for achieving the desired fiber content in the ensilage to be fed to the hogs. The drum axle is inclined to the horizontal and is adjustably supported at the inlet end of the drum so that its height relative to the outlet end can be varied.

1 Claim, 2 Drawing Figures

U.S. Patent   Apr. 14, 1981   4,261,816 ial screen plates have the same size screen openings, however, beginning with fine screens at the inlet end.

METHOD OF AND DEVICE FOR PRODUCING ENSILAGE FROM CORN-EARLAGE

CROSS REFERENCE TO RELATED APPLICATIONS

This is a continuation-in-part of application Ser. No. 005,466 filed Jan. 22, 1979 which, in turn, was a continuation of application Ser. No. 830,706 filed on Sept. 6, 1977, both now abandoned.

SUMMARY OF THE INVENTION

The present invention is directed to a method of and a device for the processing of ensilage produced from corn-earlage.

Corn-earlage is a mixture of kernels, corn-cobs and husks.

In the use of corn-earlage it has been known to separate a certain amount of the husks which retain their original structure, from the mixture before ensiling. The separation is effected in a separating device. It was assumed in such an operation that a certain amount of raw fibers from the husks remaining in the ensilage was not necessarily harmful. The separated husks in their raw fiber form were considered to be a waste product or they found only limited use after silage. Prior to the present invention, the raw fibers in the husks were considered as being hard to digest.

As a result, a complete utilization of all of the components of the corn-earlage was not considered possible.

Therefore, the primary object of the present invention is to provide a method of and a device for the preparation of ensilage formed from corn-earlage where all of the components are completely utilized as fodder. In other words, not only are the kernel and corn-cob components of the ensilage utilized, but also the husk component in its original form is used. Where the husks are referred to as being in the raw fiber form or structure, it means the original form of the husks.

As disclosed in U.S. Pat. No. 4,027,826 to Grimm et al, it is possible to process ears of corn in a chopping machine in which the corn-cobs and kernels are finely chopped, while the husks retain their raw fiber structure, that is, the husks are not finely chopped. The earlage mixture taken from the chopping machine is placed in a silo in which ensilage is produced in the usual manner. The earlage as produced can be fed to beef cattle without any special processing. However, before the ensilage produced in the silo can be fed to hogs, a certain percentage of the husks must be removed before it is used. The portion of the husks separated from the finely chopped kernels and corn-cobs can be used as a complete ensilage for ruminants or as supplemental fodder for other species of animals.

It has been discovered that, rather than a ground meal-like ensilage, ensiled coarsely structured husks are more suitable for the feeding of cattle. A certain amount of the husks in the raw fiber form is more effective for inducing the secretion of saliva and fermentation in the rumen.

In the use of this type of ensilage, 700 kg total nutrients per hectare are available and a nutrient yield has been recorded which is 20% higher as compared to wet ground corn. This is true because in wet ground corn the high amount of fibers cannot be separated in accordance with the use of the ensilage. As a result, the fiber cannot be reduced and, further, when the fiber is finely chopped or comminuted its effect on the structure of the rumen in cattle is insignificant.

Moreover, the removal of earlage ensilage from silos by means of silage propellors has proven to be extremely efficient and, generally speaking, is less susceptible to problems as compared to other types of ensilage.

Where the raw fiber components are separated prior to feeding but after ensilage, less fodder losses occur than where the separation takes place in the field or before ensiling. The disadvantage of increased silo volume which results from this method is comparatively insignificant.

As a result, in accordance with the present invention, a complete fodder can be produced from the same silo for different species of animals, and even for fish. Previously, this was not believed to be possible. In this method, the amount of plant required is substantially reduced, since the central fodder storage is provided in a single silo.

Any protein deficiency can, of course, be balanced by adding supplements in the usual manner. Thus, as required, protein-rich fodders, such as ground soy bean, can be added to the husk component of the ensilage.

Further, in accordance with the present invention, it is possible to provide an earlage ensilage which can be used as the sole basic fodder throughout the total period of the fattening of hogs with the fodder containing 6-8% raw fiber in the dry substance.

During the final fattening of hogs, however, earlage ensilage containing approximately 10% raw fiber in the dry substance can be continuously added as the exclusive energy carrier of 300 g grains daily in addition to the usual supplements of protein and minerals. When the percentage of raw fiber is higher more grains can be used.

In accordance with the present invention, a variable separation of the husk in the raw fiber form can be effected in a cylindrical or polygonally shaped screen drum. The screen drum is concentrically arranged around an inclined axle with the drum supported from the axle by means of star-shaped parts. The screen casing of the drum is formed by several rows of screens disposed in side-by-side relation with each row extending around the axle and the rows following one after the other in the direction of the axle. In other words, the screen plates form the circumferential periphery of the drum. An important feature of the present invention is that at least one screen plate in each row is removable and replaceable with another screen plate having larger or smaller screen openings than the remaining screens in the row. The removable screen plate of each row is staggered at the periphery of the screen drum relative to the removable screen plate in the adjacent row or rows. In one embodiment, the permanent screen plates include conveying means, such as conveying blades or panels, for moving the material from the inlet end to the outlet end of the drum. In another embodiment, a conveying screw can be incorporated with the axle for transporting the ensilage material.

By utilizing this device, it is possible to effect a separation of the husks in the usual raw fiber form from the finely chopped ensilage. The amount of the husks separated depends on the intended use of the ensilage.

Another feature of the invention is the use of screen plates of different screen sizes in the direction of the longitudinal axis of the screen drum beginning with fine screens at the inlet end. In this arrangement, the individual components can be mixed as required in accordance with the intended use.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE INVENTION

Figure 1:
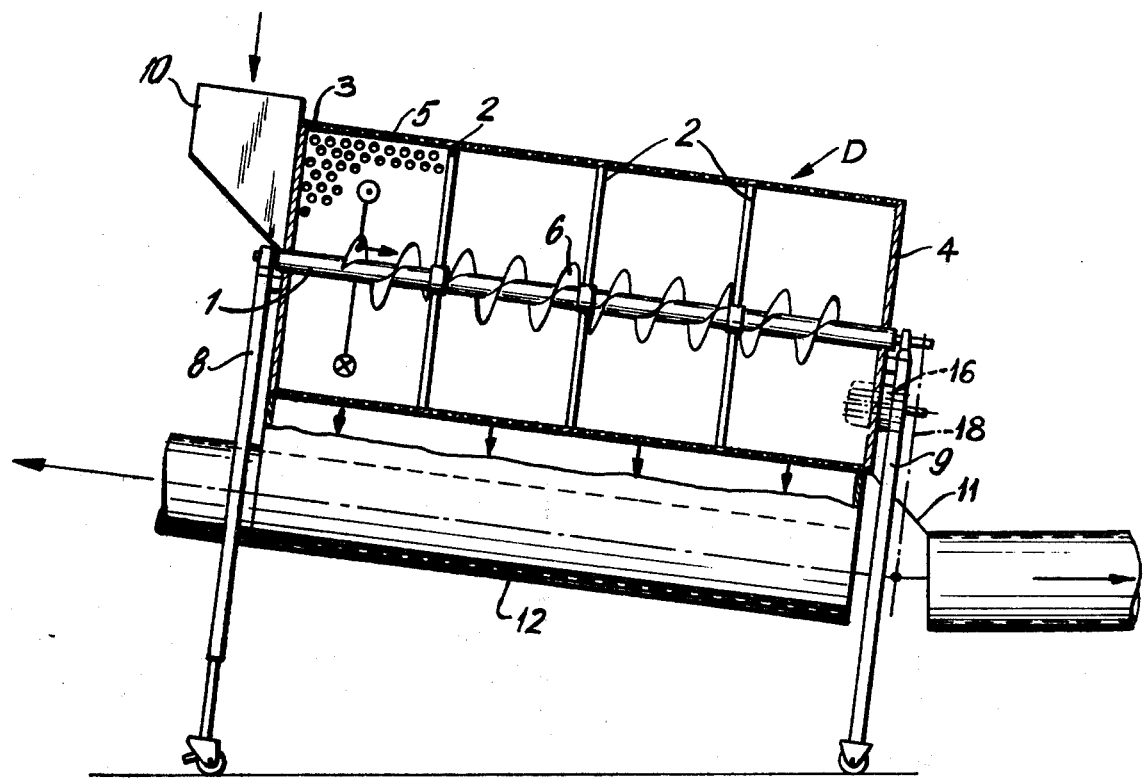
FIG. 1 is a longitudinal sectional view of a screening device embodying the present invention.
Figure 2:
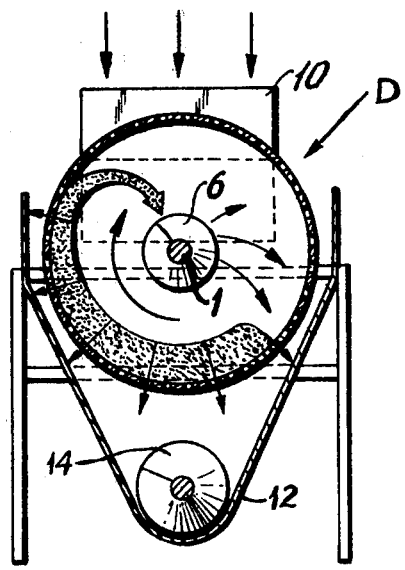
FIG. 2 is a cross-section view of the device illustrated in FIG. 1.

In FIGS. 1 and 2, a screening device is illustrated in the form of a cylindrical drum D having an elongated drum axle 1 with star-shaped parts 2 extending radially outwardly from the axle. The star-shaped parts 2 are spaced apart in the elongated direction of the axle 1 and provide support for the circumferential periphery of the drum. The drum D has an inlet end 3 and an outlet end 4. As shown in FIG. 1, four rows of screens 5 extend between the inlet and outlet ends of the drum. The first row extends from the inlet end to the adjacent or first star-shaped part 2. The next two rows extend between adjacent star-shaped parts 2 and the last row extends between the outlet end 4 and the star-shaped part 2 adjacent to it.

Each row of screens 5 includes a plurality of screen plates extending in a series arrangement around the circumferential periphery of the drum. Each row has at least one plate which is removable and replaceable by another plate having larger or smaller screen openings than the permanent screens in the row. The permanent screens 5 in each row have the same size openings through the screens while the removable screen may have the same size openings or larger or smaller openings depending on the desired separation of the material being screened. In adjacent rows, the removable screen plates are offset in the circumferential direction of the drum.

A conveying screw 6 extends around the axle 1 from adjacent the inlet end 3 to adjacent the outlet end 4. The radially outer edge of the conveying screw is spaced radially inwardly from the screens 5.

The drum axle 1 is supported at the inlet end 3 by a support 8 and at the outlet end 4 by a support 9. The support 8 is telescopically adjustable so that its height as compared to the support 9 can be varied for adjusting the inclination of the screen drum from the inlet to the outlet ends.

At the upper part of the inlet end 3, a hopper 10 is provided for introducing the ensiled earlage into the drum. An outlet chute 11 is provided at the outlet end 4 of the drum.

Positioned below the drum is a trough 12 into which material passing through the screen plates is received. A conveying member 14 is located within the trough 12 and moves the material in the direction of the arrow shown at the left hand end of the trough. Material passing through the outlet end 4 of the drum into the chute 11 moves in the direction shown by the arrow at the right hand end of FIG. 1.

The drum D and the conveying means within the outlet chute 11 and the trough 12 are driven by a drive member 16, only a portion of which is shown in FIG. 1 and is illustrated in phantom lines. The driving force is transmitted over a line 18 to the drum axle 1 and to the conveying means in the chute 11 and the trough 12.

Depending on the species of animal for which the ensiled earlage is to be used as fodder, the removable screen plates 5 are set in the different rows of the drum D. The ensiled earlage is introduced through the hopper 10 into the drum D and the drum is rotated as shown in FIG. 2. As the drum rotates a pocket of material forms as shown in FIG. 2. As the pocket approaches the apex of the drum, the material falls in the direction of the arrow toward the conveying screw 6 on the drum axle 1. The conveying screw distributes the material as shown by the arrows in FIG. 2 back against the screen plates while moving the material in the direction from the inlet to the outlet end of the drum. The finely-chopped material in the earlage passes through the screen plates into the trough 12 and a certain amount of crude fiber also passes through the screens into the trough. As indicated in the article "Corn Harvesting System with Picker Chopper, Producing 'Earlage'", Klaus Grimm, GRAIN AND FORAGE HARVESTING, reprinted from the International Grain and Forage Harvesting Proceedings, 1978, pages 274–279, at page 278, in FIG. 14, in one example of the use of the screen drum, the finely ground ears removed in the trough 12 contains 6–10% crude fiber while the material passing out of the outlet end of the drum into the chute 11 contains 20% cobs and husks and has 20–28% crude fiber.

Based on the intended use of fodder of the ensiled earlage, the removable plates in the screen drum D can be selected to provide the desired mixtures removed in the chute 11 and the trough 12. It is possible to use all of the ensiled material as fodder, there is no waste and, unlike the feeding procedures used in the past, not only the kernels and the cobs, but also the husks are entirely consumed.

While specific embodiments of the invention have been shown and described in detail to illustrate the application of the inventive principles, it will be understood that the invention may be embodied otherwise without departing from such principles.

What is claimed is:

1. A device for separating a predetermined amount of husks and chopped cobs from a mixture of ensiled finely chopped kernels, corn-cobs and husks which husks retain their original raw fiber structure comprising a cylindrically shaped screen drum, said screen drum having an inlet end at one end thereof and an outlet end at the opposite end, a drum axle extending between the inlet and outlet ends and disposed at an angle to the horizontal with the inlet end of the axle being higher than the outlet end, a screen casing defining the cylindrical periphery of said screen drum extending from the inlet end to the outlet end thereof, said screen casing comprising several rows of screens arranged in side-by-side relation in the direction of the axle with each row laterally encircling the axle and including a number of screen plates having the same size openings therethrough defining the circumferential periphery of the drum, at least one plate of each said row being removable and replaceable with another screen plate having larger or smaller screen openings than the remaining screens of the row, the removable screen plates in each said row being offset in the circumferential direction of the cylindrical drum relative to the removable screen plates of the adjacent rows, conveying means extending around the axle of said drum and spaced radially inwardly from said rows of screens said conveying means conveying the ensilage through said screen drum from the inlet to the outlet end thereof, means for adjusting the height of said axle at the inlet end of said drum, at trough means located below said drum for receiving the material passing through said screens and for conveying the material to a collecting station for subsequent use as fodder for pigs, and an outlet chute at the outlet end of said drum for removing the material which does not pass through said screens and for collecting the material for use as fodder for ruminants.

* * * * *